(12) United States Patent
Tahir et al.

(10) Patent No.: US 7,082,962 B2
(45) Date of Patent: Aug. 1, 2006

(54) SEAL SUPPORT SYSTEM FOR MAINTAINING BARRIER FLUID PRESSURE WITHIN A MECHANICAL SEAL

(75) Inventors: Nadim Tahir, Leeds (GB); James F. McKeever, Belfast (GB); Alan Roddis, Chapeltown (GB)

(73) Assignee: AES Engineering Limited, Rotherham (GB)

( * ) Notice: Subject to any disclaimer, the term of this patent is extended or adjusted under 35 U.S.C. 154(b) by 144 days.

(21) Appl. No.: 10/285,704

(22) Filed: Oct. 31, 2002

(65) Prior Publication Data

US 2003/0122323 A1 Jul. 3, 2003

(30) Foreign Application Priority Data

Oct. 31, 2001 (GB) .................................... 0126105

(51) Int. Cl.
*F16K 51/00* (2006.01)

(52) U.S. Cl. ....................... 137/391; 137/434; 277/359; 277/408; 415/170.1; 415/174.5

(58) Field of Classification Search ................ 137/334, 137/338, 339, 340, 391, 434; 277/304, 319, 277/320, 359, 408; 415/170.1, 174.5; 417/299, 417/366

See application file for complete search history.

(56) References Cited

U.S. PATENT DOCUMENTS

| 4,986,113 | A |   | 1/1991  | Harrison et al. |
|-----------|---|---|---------|-----------------|
| 5,249,812 | A | * | 10/1993 | Volden et al. ............... 277/408 |
| 5,746,435 | A | * | 5/1998  | Arbuckle ..................... 277/304 |
| 5,827,042 | A | * | 10/1998 | Ramsay ...................... 415/112 |
| 6,070,880 | A | * | 6/2000  | McKeever .................. 277/304 |
| 6,210,103 | B1|   | 4/2001  | Ramsay |
| 6,210,107 | B1| * | 4/2001  | Volden et al. ........... 415/170.1 |

FOREIGN PATENT DOCUMENTS

GB 1518840 7/1978
JP 6-113503 4/1994

* cited by examiner

*Primary Examiner*—Kevin Lee
(74) *Attorney, Agent, or Firm*—Edwin D. Schindler

(57) ABSTRACT

An intelligent seal support management system includes a device for automatically compensating for increased heat or decreased heat in a vessel.

10 Claims, 8 Drawing Sheets

SECTION A-A

SEAL SUPPORT SYSTEM FOR MAINTAINING BARRIER FLUID PRESSURE WITHIN A MECHANICAL SEAL

This invention relates to Seal Support Systems and especially systems, which are used with mechanical seals for the containment of process fluid.

A seal support system comprises of a vessel or tank, which generally contains a volume of fluid. The vessel is piped to a sealing device on a pump, mixer or item of rotating equipment. Generally a return pipe is lead back to the vessel from the sealing device, hence closing the "loop". This allows the fluid, contained in the vessel, to enter and exit the sealing device. Such fluid is generally chosen so that it lubricates and cools the components within the sealing device, whilst being compatible with the process fluid.

The industry term for the fluid contained within the vessel, is Barrier or Buffer fluid.

It is not uncommon for the seal support system to have other items of equipment, sited around the vessel, to permit pressure being applied to the barrier/buffer fluid, or to allow additional cooling or fluid circulation around the seal.

Generally the sealing device sited on the item of rotating equipment is a mechanical seal comprising of a rotating member which is secured to a shaft, and a stationary member which is secured to a housing.

The interface, between the rotating member and the stationary member, on the mechanical seal, prevents the processed product from escaping.

It is a well-documented fact that the majority of mechanical seals have a fluid film, acting between the two sliding seal faces. This fluid film lubricates the set of seal faces. The wider the fluid film, the more the mechanical seal can be said to leak. Therefore over time, some fluid loss from the vessel is to be expected.

Furthermore, mechanical seals are often subjected to process upsets. Pressure surges and sudden rises in fluid temperature can result in barrier/buffer fluid loss.

Yet further loss of fluid from the vessel may result due to evaporation.

Therefore a modular system which automatically compensates for fluid loss is deemed to be advantageous.

During the rotating equipment's operation, the mechanical seal generates heat, which is transferred into the barrier/buffer fluid. This raises the bulk temperature of the barrier/buffer fluid in the vessel thereby causing the fluid to expand.

It is quite common to encounter seals which when subjected to process upsets, have sudden excursions of increased temperature generation. Often the support system is not capable of removing this unexpected additional heat, as it was not anticipated during the initial installation. The mechanical seal is therefore prone to overheating and failure/leakage.

It is deemed to be further advantageous if a seal support system can sense the increased temperature of the buffer/barrier fluid and automatically compensate for this sudden effect.

The present invention provides a modular automatic filling system, given barrier/buffer fluid loss. The systems modular construction allows a further unit to added to the vessel to automatically sense fluid temperature. Used in conjunction with the automatic filling system, it has been surprising found that the invention is an intelligent system which ensures that the temperature of the barrier/buffer fluid does not exceed the mechanical seals operating temperature.

Automatic filling systems are commonly encountered in domestic lavatory header tank systems. Such units employ a ball-cock design connected to a float valve. As water is drained out of the tank, the float valve drops and fresh water enters the tank. When the required level of water is reached in the tank, a valve is closed and the water entering the tank stops.

There are several patents relating to such a design.

Grant 1986 (U.S. Pat. No. 4,615,056), Raz et al (1995) U.S. Pat. No. 0,539,665 and Gil 1998 (U.S. Pat. No. 6,035,888) are typical. These define various inventions for use inside large physical spaces, typically lavatory header tank systems. All of the inventions are mounted inside a large tank where physical space is plentiful and suitable access is provided by the removal of a tank lid or cover.

The present invention differentiates itself from the aforementioned inventions in several fundamental areas.

The present invention, including float valve, fits through a small opening. Said opening is typically 20 mm to 25 mm (0.75" to 1.00") in diameter. It is deemed self evident that the invention could be fitted in smaller or larger openings if required.

A further difference is that the mechanism that allows the inlet fluid to enter the tank, is externally mounted to the main tank. Fluid is sealed and directed through a separate orifice in the tank body. This is different to Grant (U.S. Pat. No. 4,615,056), Raz et al (U.S. Pat. No. 0,539,665) and Gil (U.S. Pat. No. 6,035,888) in that the mechanism with allows fluid to enter the tank is sited inside the large tank.

By way of example only, a further difference is the method that the present invention is mounted to the tank. The seal support vessel is a modular design and a "closed-end" construction. This closed-end construction has only one access side. All ancillary instrumentation to the seal support vessel is connected via one or more threads typically mounted on the vessel.

In the prior-art, aforementioned patents, access to the water retention tank is from two sides, since the tank system has a large removable lid/cover. The wall of the tank is sandwiched between two components of the ball-cock arrangement. Experienced readers will refer to this as "panel mounted".

This is again a major difference between the present invention and the prior art. It is not possible to panel mount the automatic filling mechanism in a conventional seal support system.

By way of example only, a prior art seal support system is illustrated, in FIG. 1.

The present invention is described by way of example only with reference to the accompanying drawings, in which:

FIG. 2 illustrates An isometric of the invention.

FIG. 3 corresponds to FIG. 2, and shows a cross section through the invention.

FIG. 4 corresponds to FIG. 2, and shows a cross section through the compact Ball-cock design.

FIG. 5 corresponds to FIG. 4, and by way of example only shows an alternate compact ball-cock design.

By way of example only, FIG. 6 illustrates an adaptation of FIG. 2, including an integral sight glass and thermostatic valve for automated temperature adjustment.

Figure 1:
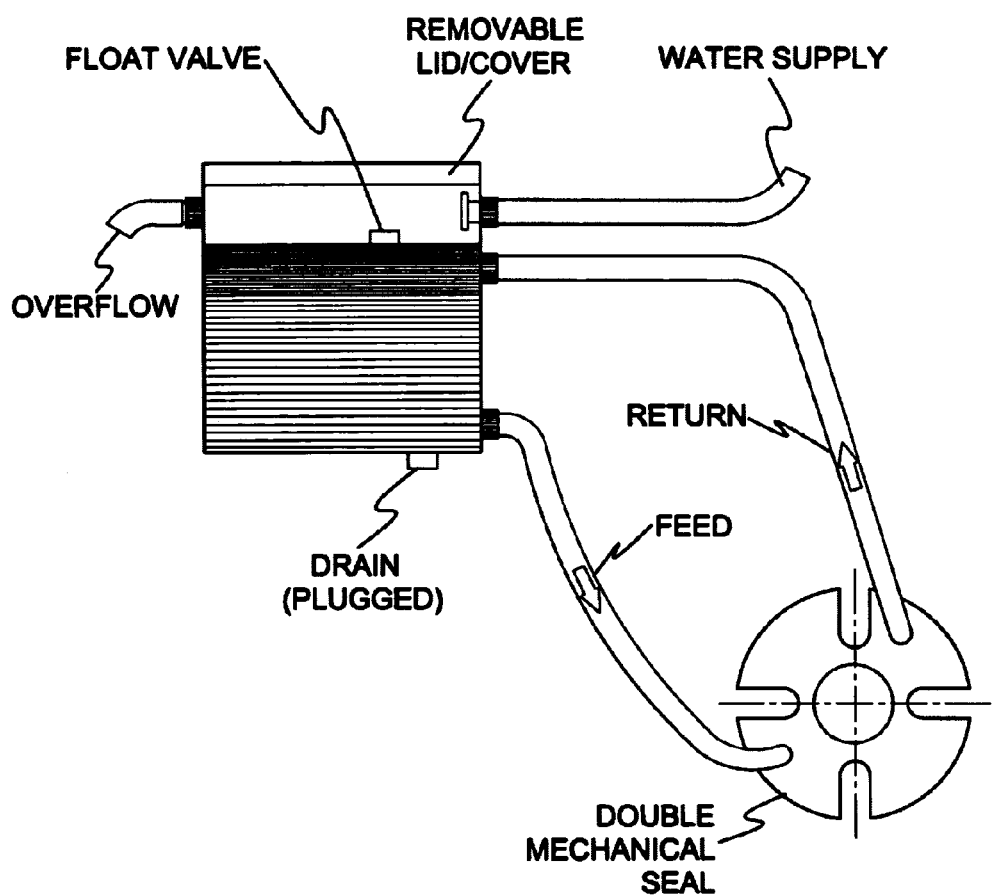
Figure 2:
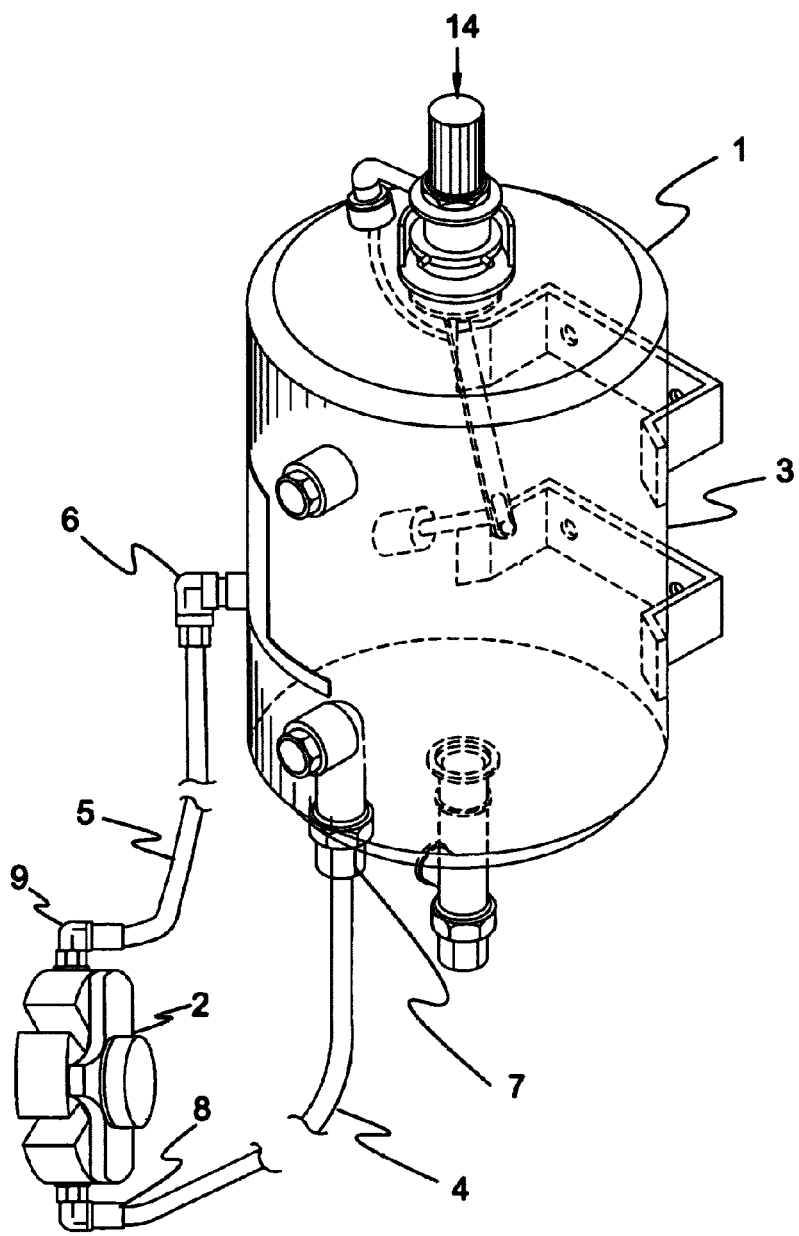

FIG. 2 therefore shows a seal support system (1) according to the invention, which is connected, to a mechanical seal (2).

The seal support system (1) consists of a vessel (3) connected to the mechanical seal (2) by a feed pipe (4) and a return pipe (5) and the appropriate pipe connectors (6), (7), (8) and (9).

Figure 3:
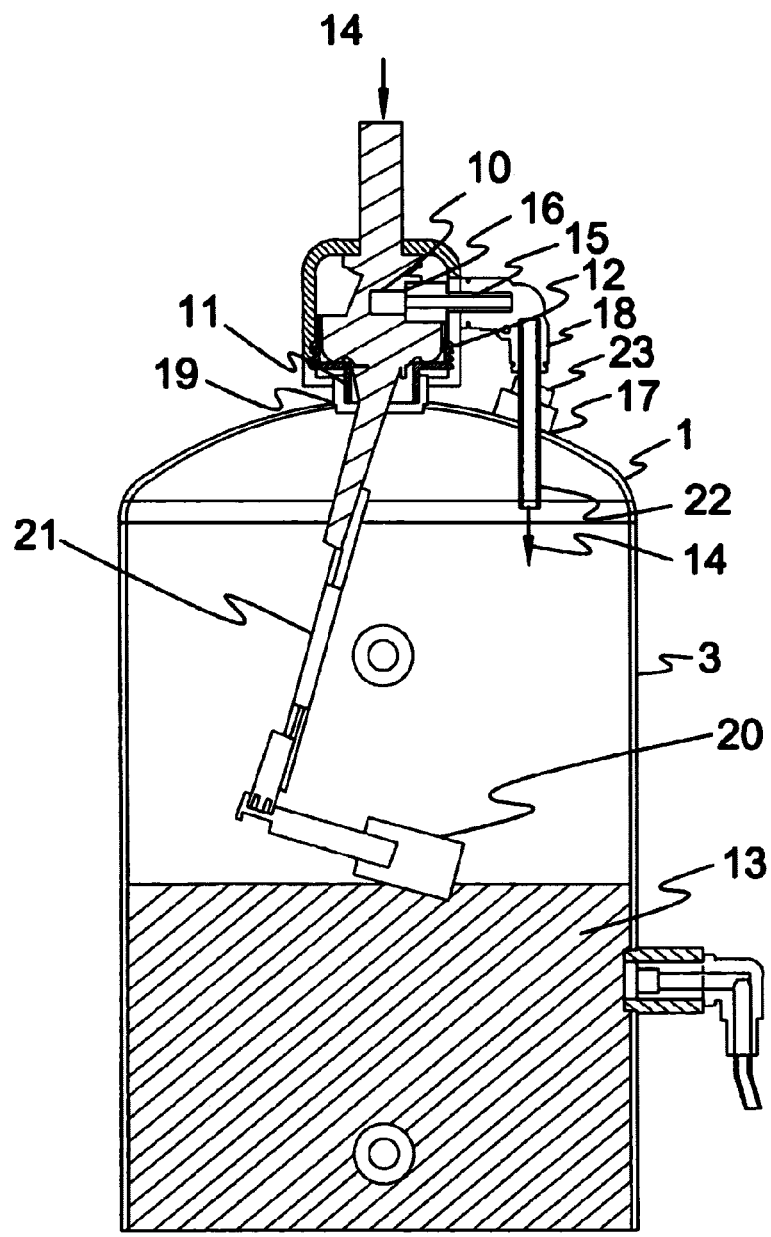
Figure 4:
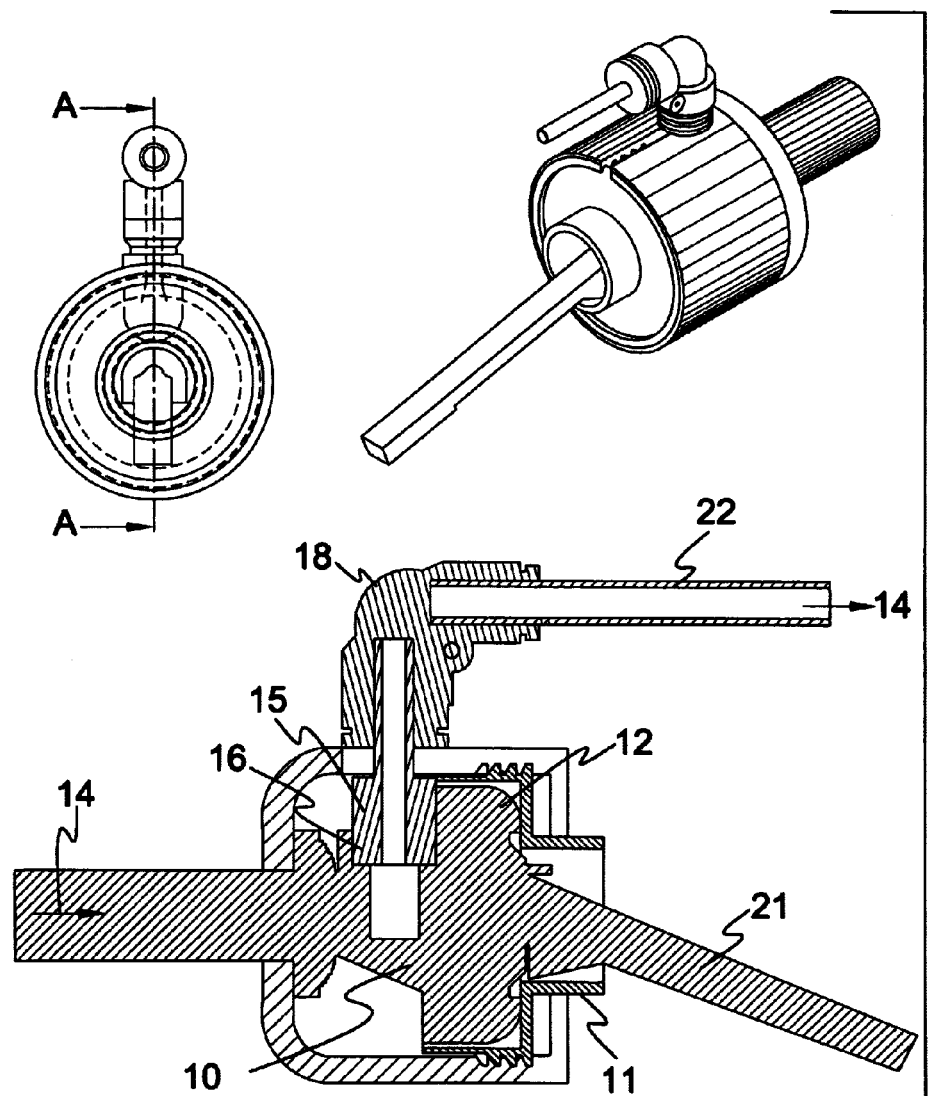
Figure 5:
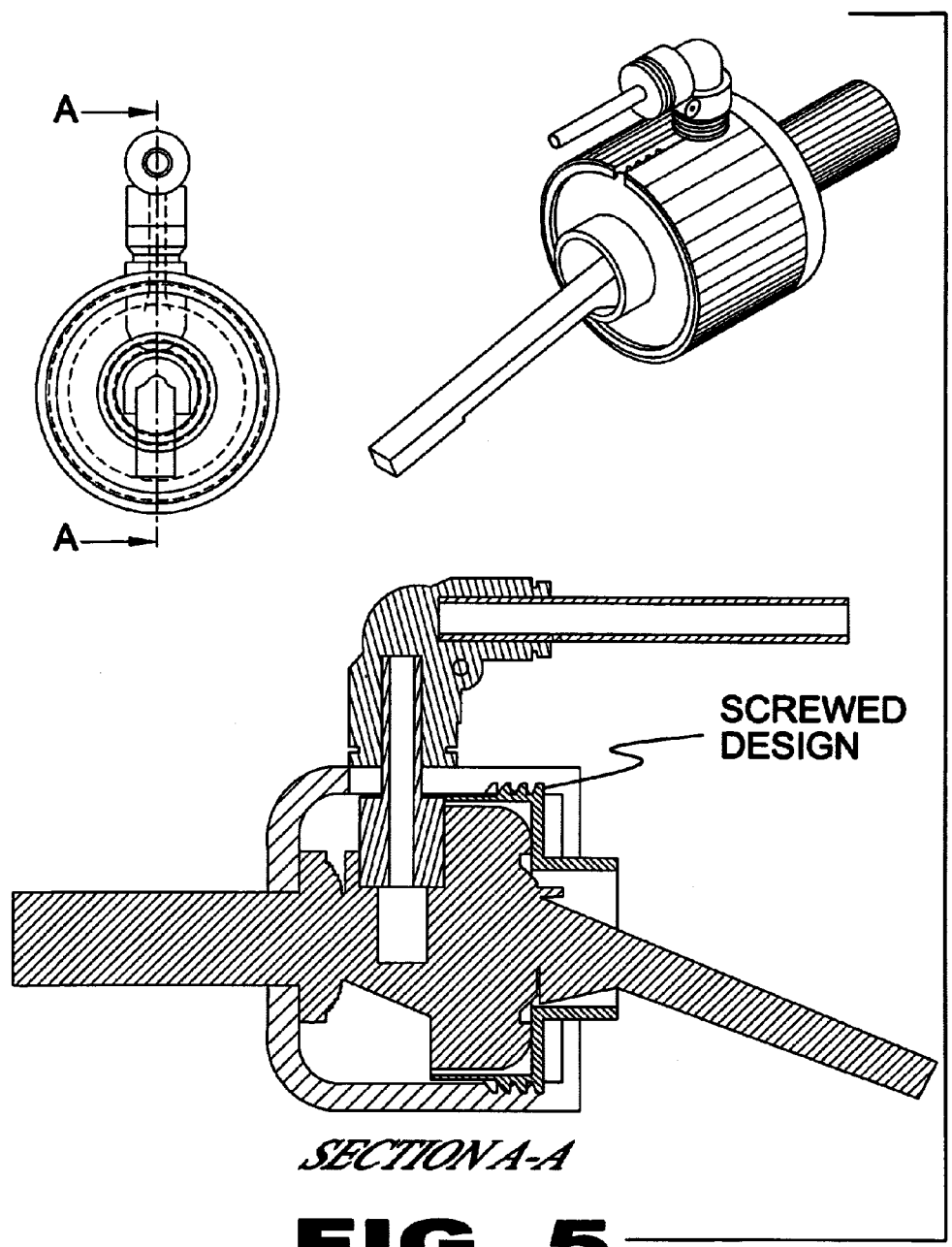

From FIG. 3, the ball-cock mechanism (10) is connected to adapter (11) via a nut (12). By way of example only, it will be considered that the said barrier/buffer fluid (13) is water supplied from a ring main water system (14).

A pipe (15) is sealed by o-ring (16) to ball-cock mechanism (10). Said pipe (15) is directed to a second orifice (17) in the vessel (3). An elbow connector (18) is shown, by way of example only, to re-direct the pipe (15) to the opening (17). It is considered self evident that the elbow connector (18) could be omitted given that the pipe (15) is bent in situ.

The adapter (11) is screwed to the primary orifice (19) in the vessel (3).

The float (20) is connected to the ball-cock mechanism (10) by arm (21). The float (20) is designed to fit through the small orifice (19) in the tank (3).

The pipe (22) is fitted through the dust cap (23) which is connected in the second orifice (17) in vessel (3).

It is considered self evident to the experienced reader; that an over-fill pipe, if required, could be routed out of the vessel, at the second orifice (17) position, or another more suitable position.

From FIG. 2, if mechanical seal (2) leaks the vessel (3) will be automatically replenished, from the ring main (14), by virtue that the float (20) lowering and activating the ball-cock mechanism (10).

It is considered self evident to the experienced reader that any type of barrier/buffer fluid media may be employed with the invention, in both a water retention or pressure system application, or in any type of vessel material.

Figure 6:
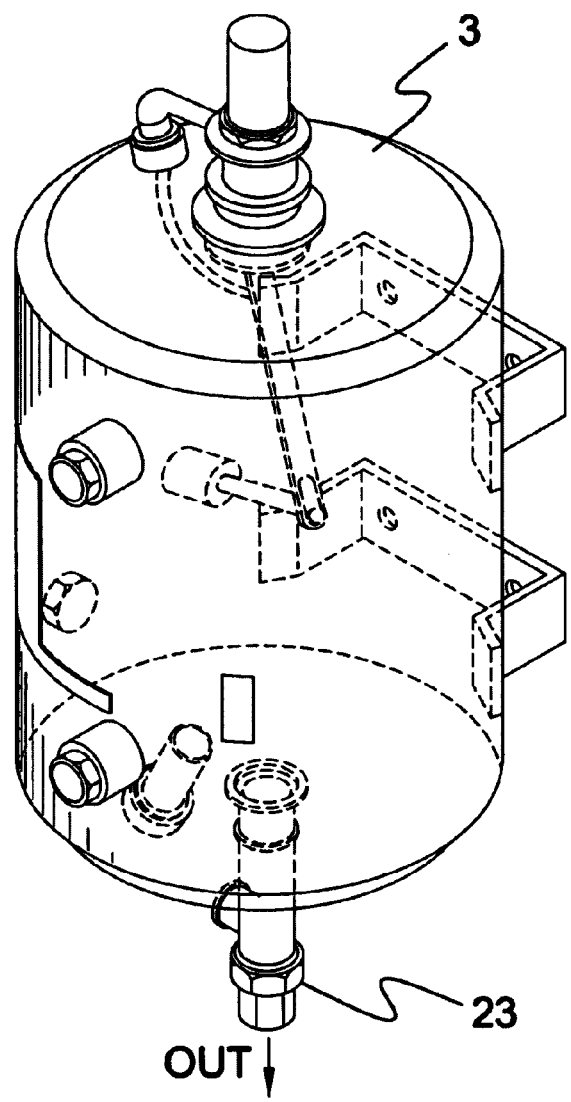

FIG. 6 corresponds to FIG. 2 and illustrates a thermostatic valve (23) positioned near to the bottom if the vessel (3).

The thermostatic valve (23) may be set to a maximum temperature. Under normal operation, the valve remains closed as the temperature is within the limits of the mechanical seal (2). If the temperature of the buffer/barrier fluid (13) reaches the temperature set on the thermostatic valve (23), the valve slowly allows some of the hot barrier/buffer fluid (13) out of the vessel.

Simultaneously and automatically, the float (20) will lower and activating the ball-cock mechanism (10) replenishing the vessel with cooler barrier/buffer fluid (13).

Once the barrier/buffer temperature has reduced, the thermostatic valve (23) closes and the system returns back to normal operation.

It is apparent, to the experienced reader, that this intelligent seal support system design will be of major benefit to the mechanical seal industry.

It is considered self evident to the experienced reader that the modular construction of the seal support vessel offers many advantages over conventional vessel designs.

It is also apparent the two parts of the invention can be independent of each other as well as together when forming the intelligent system. The invention may also be used with other designs and instrumentation packs, as well as with metallic and non-metallic vessels.

Figure 7:
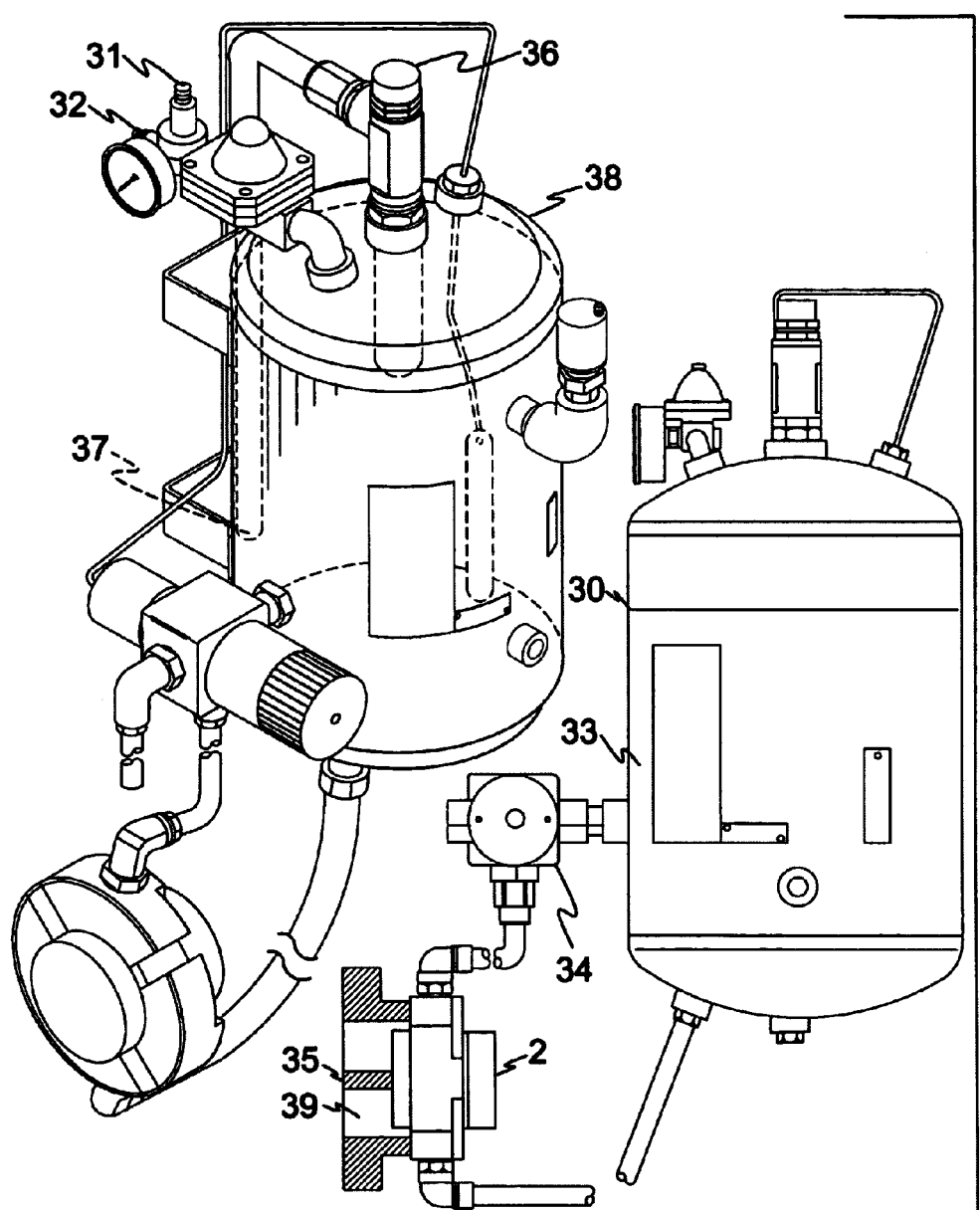
FIG. 7 shows by way of example only, a vessel, thermostatic valve and water regulator valve connected to a ring main supply.

From FIG. 7, it will be clear to an experienced reader, that the vessel (30), of the invention could be connected to a water regulating valve (31) of the invention. Said water regulating valve (31) is in turn connected to a mains water supply (32) providing fluid into the tank. In a similar matter to the auto re-fill design of the invention, the water regulating valve (31) could be set so that it open up, thereby releasing fluid into the vessel (30), if the pressure inside the vessel changes.

In the case of a mechanical seal (2) small leak, some fluid (33) in the vessel would be lost by the mechanical seal (2). The pressure in the vessel (30) would therefore change activating the regulating valve (31). Said valve (31) would open allowing new fluid (33) into the vessel (30).

This intelligent seal support system of the invention is of major advantage.

Furthermore, from FIG. 7, two thermal valves (34) and (35) could be placed on the vessel (30). Thermal valve (34) is preferably a cold activated valve and thermal valve (35) is preferably a hot activated valve.

In certain applications the vessel fluid (33) can freeze, particularly if the rotating equipment (35) and mechanical seal (2) is not activated and thereby generating heat into the fluid (33).

If the fluid (33) freezes and the rotating equipment is activated, then the fluid will not thaw in time before damage occurs to the mechanical seal (2). This situation must be avoided.

The design of the invention is of benefit in such applications since the cold valve (34) can be set to open, when the temperature of the fluid (33) reaches a certain level. This removes fluid (33) from the vessel (30) allowing the pressure to drop and thereby activating the regulating (31) to allow new fluid to enter the vessel (30).

The constant movement of the fluid (33) travelling out of the vessel (30) from valve (34) and into the vessel from valve (31) reduces the chance of the fluid (33) freezing.

Clearly from FIG. 7, if the reverse occurs and the fluid (33) temperature rises, this temperature rise will activate the hot thermal valve (36). Said hot thermal valve (36) would allow fluid (33) out of the vessel (30) through a drain hole (37). Said fluid loss (33) would once again reduce the pressure in the vessel (30) thereby activating regulating valve (31) allowing cool, fresh fluid (33) into the vessel (30). Once again, this movement of fluid (33) would continue until such a time when the fluid (33) temperature stabilised below the temperature set on the hot valve (36).

This intelligent system (38) of the invention is therefore of considerable benefit as it can adjust itself for both hot and cold applications.

In some applications, the mechanical seal (2) fails suddenly. This causes all the fluid (33) in the vessel (30) to flow into the mechanical seal (2) and then into the sealed process media (39). In some applications contamination of the process media (39) can be disastrous and lead to loss of whole batches of process media (39). This can be very costly to the user.

Figure 8:
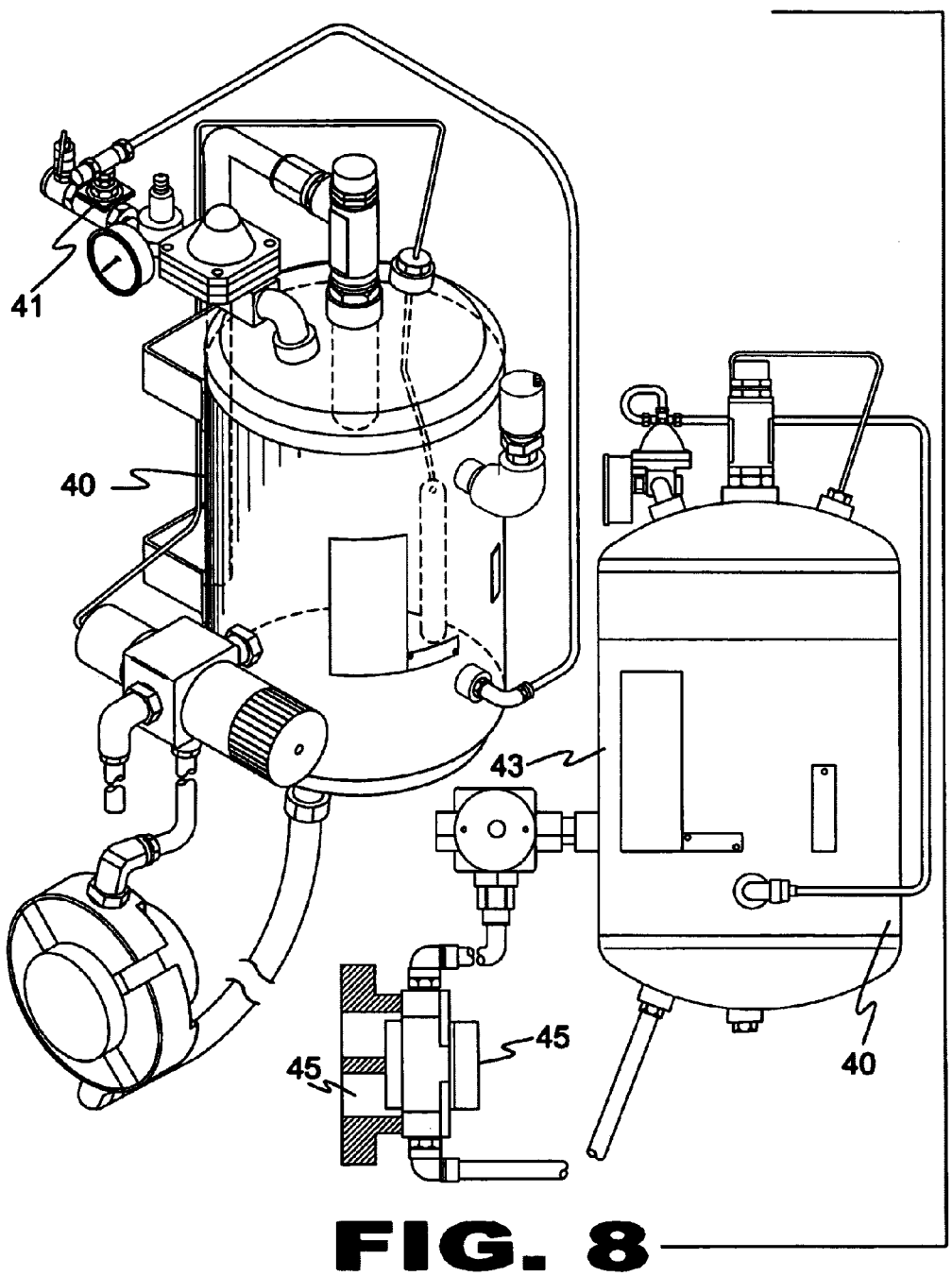
FIG. 8 shows by way of example only, flow fuse valve and water regulator valve connected to a ring main supply.

FIG. 8 corresponds to FIG. 7 and shows a system (40) of the invention with a flow fuse valve (41). Said flow fuse valve (41) monitors the flow of the fluid (42) entering the vessel (43). In applications where excess flow is monitored, the flow fuse valve (41) closes and prevents further fluid (43) entering the vessel (42). This reduces the volumetric amount of fluid (42) that could enter the process media (44) given a sudden mechanical seal failure (45).

This intelligent system (40) of the invention is therefore of considerable benefit.

Clearly, both hot and cold thermal valves and the fuse flow valve could be used with both a pressure type application were a regulating valve is employed and/or an application were the ball-cock auto-refilling design of the invention is employed.

Clearly, the experienced reader will appreciate that any combination of said devices could be employed, to suit the application requirements.

What is claimed is:

1. A seal support system for maintaining barrier fluid pressure within a mechanical seal, comprising:
   a vessel for fluid connection to a mechanical seal; and,
   a water regulating valve in fluid communication with said vessel and with a mains water supply, said water regulating valve being activated by a reduction in pressure from a predetermined value within said vessel caused by a leakage of a barrier fluid at the mechanical seal, the activation of said water regulating valve allowing pressurized water to enter said vessel from the mains water supply, thereby maintaining the pressure within said vessel at said predetermined value.

2. The seal support system for maintaining barrier fluid pressure within a mechanical seal according to claim 1, wherein said vessel is a modular seal support vessel with a compact ball-cock device inside said modular seal support vessel.

3. The seal support system for maintaining barrier fluid pressure within a mechanical seal according to claim 2, wherein said compact ball-cock device is capable of fitting through an orifice as small as 10 mm in diameter.

4. The seal support system for maintaining barrier fluid pressure within a mechanical seal according to claim 3, wherein said compact ball-cock device is capable of fitting through an orifice of 22 mm in diameter.

5. The seal support system for maintaining barrier fluid pressure within a mechanical seal according to claim 1, further comprising a thermo-static valve for regulating temperature of a barrier/buffer fluid.

6. The seal support system for maintaining barrier fluid pressure within a mechanical seal according to claim 1, further comprising a thermal valve for regulating temperature of a barrier/buffer fluid.

7. The seal support system for maintaining barrier fluid pressure within a mechanical seal according to claim 1, further comprising a ball-cock mechanism and at least one thermo-state valve for jointly regulating temperature of a barrier/buffer fluid.

8. The seal support system for maintaining barrier fluid pressure within a mechanical seal according to claim 1, further comprising a first thermo-static valve and a second thermo-static valve, said first thermo-static valve for regulating a high, or hot, fluid temperature and said second thermo-static valve for regulating a low, or cold, fluid temperature with each of said valves opening when a set temperature is reached.

9. The seal support system for maintaining barrier fluid pressure within a mechanical seal according to claim 1, further comprising at least one fluid flow valve having sensor means, said fluid flow valve being capable of closing when said sensor means detects an increased fluid flow to said vessel.

10. The seal support system for maintaining barrier fluid pressure within a mechanical seal according to claim 1, wherein the barrier fluid is water.

* * * * *